(12) United States Patent
Jagger (10) Patent No.: US 9,750,358 B2
(45) Date of Patent: Sep. 5, 2017

(54) SUCTION BASE UNIT AND RECEPTACLE

(71) Applicant: Little People Manufacturing Ltd, Wanchai, Hong Kong (CN)

(72) Inventor: Robin Drummond Jagger, Dalkeith (AU)

(73) Assignee: Little People Manufacturing Ltd., Wanchai, Hong Kong (CN)

(*) Notice: Subject to any disclaimer, the term of this patent is extended or adjusted under 35 U.S.C. 154(b) by 0 days.

(21) Appl. No.: 14/433,822

(22) PCT Filed: Oct. 7, 2013

(86) PCT No.: PCT/AU2013/001149
§ 371 (c)(1),
(2) Date: Apr. 6, 2015

(87) PCT Pub. No.: WO2014/056023
PCT Pub. Date: Apr. 17, 2014

(65) Prior Publication Data
US 2015/0230638 A1  Aug. 20, 2015

(30) Foreign Application Priority Data
Oct. 10, 2012  (AU) ............................... 2012904427

(51) Int. Cl.
  *A47G 19/10*  (2006.01)
  *A47G 29/093* (2006.01)
  (Continued)

(52) U.S. Cl.
  CPC ............ *A47G 19/10* (2013.01); *A01K 5/0135* (2013.01); *A01K 7/005* (2013.01); *A47G 29/093* (2013.01); *F16B 47/006* (2013.01)

(58) Field of Classification Search
  CPC ..... A47G 19/10; A47G 29/093; F16B 47/006; A01K 7/005; A01K 5/0135
  (Continued)

(56) References Cited

U.S. PATENT DOCUMENTS 6,318,683 B1  11/2001  Savoy
6,808,090 B2 * 10/2004  Pedersen ................ B65D 25/22
                                                    215/399

(Continued)

FOREIGN PATENT DOCUMENTS

BE         903 555    2/1986
EP       1 254 598   11/2002
(Continued)

*Primary Examiner* — Jeffrey Allen
*Assistant Examiner* — Jennifer Castriotta
(74) *Attorney, Agent, or Firm* — Hamre, Schumann, Mueller & Larson, P.C.

(57) ABSTRACT

A food receptacle (12), such as a child's food bowl, which can be secured to a flat surface by a suction base unit (10) is described. The suction base unit (10) is of low-profile and is adapted to be attached to a flat surface by a vacuum formed between a suction pad (14) in the suction base unit (10) and the flat surface. The food bowl (12) has a base (16) with a rim (18) adapted to rest on the flat surface to support the bowl (12) on the surface. The base (16) has a recess (20) adapted to receive the suction base unit (10) therein. Because the suction base unit (10) is of low profile it can be wholly contained within the base (16) of the bowl. A securing mechanism (22) is provided for releasably securing the suction base unit (10) within the base (16) of the food receptacle (12). In use, when the suction base unit (10) is attached to a flat surface and the receptacle (12) is secured thereto the rim (18) of the receptacle base (16) presses against the flat surface and supports the receptacle thereon.

5 Claims, 8 Drawing Sheets (51) Int. Cl.
*A01K 5/01* (2006.01)
*A01K 7/00* (2006.01)
*F16B 47/00* (2006.01)

(58) Field of Classification Search
USPC ............ 119/61.54, 61.5; 220/630, 483; 248/25.8, 362, 205.5–206.4
See application file for complete search history.

(56) References Cited

U.S. PATENT DOCUMENTS

| | | | |
|---|---|---|---|
| 8,151,481 B2 * | 4/2012 | Perez, Jr. | A45D 20/14 248/160 |
| 2004/0251702 A1 | 12/2004 | Ishii | |
| 2006/0264238 A1 * | 11/2006 | Jung | B60R 11/02 455/557 |
| 2006/0284043 A1 * | 12/2006 | Paradise | A47G 29/093 248/362 |
| 2007/0290105 A1 * | 12/2007 | Liu | F16B 47/006 248/205.5 |
| 2009/0090757 A1 * | 4/2009 | Kim | B60R 11/0235 224/559 |
| 2010/0176253 A1 * | 7/2010 | Son | A47G 19/10 248/121 |
| 2012/0097813 A1 * | 4/2012 | Li | F16B 47/006 248/220.22 |
| 2012/0112023 A1 * | 5/2012 | Tollman | F16B 47/006 248/205.7 |

FOREIGN PATENT DOCUMENTS

| | | |
|---|---|---|
| GB | 2 438 626 | 5/2008 |
| WO | 2010/142975 | 12/2010 |

* cited by examiner

SUCTION BASE UNIT AND RECEPTACLE

FIELD OF THE INVENTION

The present invention relates to a food receptacle for small children and a suction base unit to hold the receptacle on a surface and relates particularly, though not exclusively, to a child's food bowl with a suction base unit.

BACKGROUND TO THE INVENTION

Babies and small children, such as toddlers, gradually learn to eat solid food as they acquire teeth and the fine motor skills needed to pick up the food with their own fingers and hands. Over time they also learn to feed themselves from a food receptacle, such as a bowl, plate or dish. However during the process of learning the skills and discipline needed to feed themselves, a child will often accidentally or deliberately knock the food receptacle off the table or surface on which it is sitting while they are eating. The process of dropping the receptacle onto the floor and the carer having to retrieve it can become a bit of a game, much to the amusement of the child and the frustration of the carer.

In order to minimise the frustration of having to constantly retrieve a dropped food receptacle and to clean-up the consequent mess, various types of prior art suction bases for securing the food receptacle to a table surface have been devised. All suction bases currently on the market, which provide a non-moveable/fixed mounting device for fixing an object to a flat surface, have the object mounted on the suction base unit and use the suction base as the sole provider for stability and support.

Most prior art suction bases which use the mechanism of a push down, pull up movement to create a vacuum, use a spring attached to the central spine between the suction membrane and the suction base plate. The spring enables the membrane to return to its original position once the base is unlocked from the flat surface and also provides firm pressure in the downward movement. The use of a spring requires the unit to be of a height sufficient to contain the spring and to allow the spring to be compressed and return from its compressed state. However this increased height above the table surface affords the child a substantial degree of leverage and it is possible for the child to figure out that by gripping the receptacle and applying sufficient force the suction can be broken. In addition, the increased height of the receptacle above the table surface is rather unnatural and does not teach the child that a bowl or plate normally rests on the table surface.

Bowls which attach to surfaces using suction base units either have a flexible membrane directly attached to the bowl, (usually a separate ring made of flexible material which is friction fitted to the base of the bowl) or the bowl is locked down onto the suction base unit using a bayonet fitting. With the latter type of suction base unit, it often doesn't take long for the child to figure out that by applying a simple twisting action to the bowl it can be removed from the base unit without too much difficulty.

The present invention was developed with a view to providing a suction base unit and receptacle that is of low profile and that is more difficult for a child to remove from the surface to which it is attached compared to the prior art suction base food receptacles.

References to prior art in this specification are provided for illustrative purposes only and are not to be taken as an admission that such prior art is part of the common general knowledge in Australia or elsewhere.

SUMMARY OF THE INVENTION

According to one aspect of the present invention there is provided a suction base unit combined with a food receptacle which can be secured to a flat surface by the suction base unit, the combination comprising:
a low-profile suction base unit adapted to be attached to a flat surface by a vacuum formed between a suction pad in the base unit and the flat surface;
a food receptacle having a base with a rim adapted to rest on the flat surface to support the receptacle on the surface, the base having a recess adapted to receive the suction base unit therein; and
a securing mechanism for releasably securing the suction base unit within the base of the food receptacle wherein, in use, when the suction base unit is attached to a flat surface and the food receptacle is secured thereto, the rim of the receptacle base presses against the flat surface and supports the receptacle thereon.

Preferably the securing mechanism comprises a plurality of interlocking surfaces provided on the suction base unit and within the recess of the base of the bowl respectively. The suction base unit preferably comprises a base plate which has a first set of interlocking surfaces provided thereon. Preferably the first set of interlocking surfaces are in the form of a plurality of tabs which extend laterally from the base plate. Preferably a second set of interlocking surfaces is provided on undercuts within the base of the bowl.

Preferably the undercuts are formed by attaching a C-shaped plate into the recess of the base of the bowl.

According to a second aspect of the present invention there is provided a suction base unit combined with a food receptacle which can be secured to a flat surface by the suction base unit, the combination comprising:
a suction base unit adapted to be attached to a flat surface by a vacuum formed between a suction pad in the base unit and the flat surface;
a food receptacle having a base with a recess adapted to receive the suction base unit therein;
a securing mechanism for releasably securing the suction base unit within the base of the food receptacle, the securing mechanism allowing movement of the suction base unit within the base of the receptacle between a released position and a secured position.

Preferably the securing mechanism comprises first and second tabs within the recess of the base of the receptacle, which are adapted to engage with first and second tabs on the suction base unit when the suction base unit is in the secured position. The base of the receptacle preferably has an aperture which is large enough to receive the suction base unit there through in a released position. Typically once the suction base unit is received in the base of the bowl, it can be moved to a secured position by sliding the unit so that the first and second tabs on the suction base unit and the first and second tabs in the base have to flex when they engage with each other respectively, as they are deliberately designed to interfere with each other. Advantageously when the bowl is moved relative to the suction base unit to bring the base unit to the secured position, it effectively pulls the base of the bowl downwards so that it presses against the flat surface and is firmly supported thereon.

Preferably a locking mechanism is provided in connection with the suction base unit, the locking mechanism being adapted to releasably lock the suction base unit within the base of the receptacle when it is in the secured position wherein, in use, in order to separate the receptacle from the suction base unit the locking mechanism must first be released and the suction base unit must then be moved from the secured to the released position.

According to a third aspect of the present invention there is provided a suction base unit for securing an object to a flat surface, the suction base unit comprising:

a suction pad adapted to attach the suction base unit to a flat surface by a vacuum formed between the suction pad and the flat surface;

a central core component provided in connection with the suction pad and adapted to form the vacuum between the suction pad and the flat surface when it is lifted from the surface;

a base plate having a central opening through which part of the central core component extends; and, a lifting mechanism operatively connected to the central component and adapted to move the central core component between a released position and a lifted position wherein, in use, when the suction base unit is pressed against a flat surface and the lifting mechanism is operated to move the core component from the released to the lifted position the base unit is securely attached to the flat surface by the vacuum formed between the suction pad and the flat surface.

Advantageously the lifting mechanism comprises a handle which is pivotally connected to the central core component by a pivot pin, the handle being movable between first, second and third positions corresponding to the released position, engaged position and the lifted position of the central core component respectively. Preferably the pivot pin is received in first and second channels which are provided on an upper surface of the base plate on either side of the central opening wherein, in use, the channels enable the pivot pin to engage with both the handle and the core component and prevent lateral movement of the base plate (and hence the object). Preferably the handle is generally planar and is movable through substantially 180°, so that it lies substantially parallel to the base plate in both the first and third positions. Typically the handle lies substantially at 90° to the base plate when it is in the second position.

Preferably the handle is in the shape of a half-annulus, having first and second pivot portions provided at each end of the half-annulus. Preferably the pivot pin is received in and extends between the first and second pivot portions, the first and second pivot portions engaging with an upper surface of the base plate when the handle is moved between the first, second and third positions. Preferably a pivot axis of the pivot pin which passes through the first and second pivot portions, is offset from a central plane of the handle, so that when the handle is moved from the first through to the third position the pivot pin is lifted away from the upper surface of the base plate.

Preferably the base plate further comprises a locking lever which is adapted to engage with a part of a base of an object, such as a food receptacle, to releasably lock the suction base unit within the base of the object. Typically the locking lever extends radially outwards from the base plate and is sufficiently resilient to be able to flex between a locked position and a released position.

Preferably the suction pad is substantially circular in shape and the base plate is also of generally circular shape. Advantageously the base plate is formed with first and second substantially straight edge portions, the first and second straight edge portions being provided on opposite sides of the base plate and being substantially parallel to each other. Preferably the first and second straight edge portions are adapted to engage with corresponding first and second flat surfaces provided in a base of the food receptacle.

Typically the object is a food receptacle for children.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of a specific embodiment of the suction base unit and food receptacle, given by way of example only, with reference to the accompanying drawings, in which:

FIGS. 3 (a) and (b) are bottom perspective views of the suction base unit and food receptacle of FIG. 1, showing the suction base unit in a secured position and released position respectively;

FIGS. 4 (a) and (b) are partially cutaway side elevations of the suction base unit and food receptacle of FIG. 1, showing the suction base unit in a secured position and released position respectively;

FIGS. 8 (a), (b), and (c) are top perspective views of the suction base unit of FIG. 6 showing the handle in a flat position, an upright position, and another flat position respectively.

DETAILED DESCRIPTION OF PREFERRED EMBODIMENTS

A first embodiment of the suction base unit 10 and food receptacle 12 in accordance with the invention is illustrated in FIGS. 1 to 8. The food receptacle in this embodiment is a child's food bowl 12 which can be secured to a flat surface by the suction, base unit 10. The suction base unit 10 is of low-profile and is adapted to be attached to a flat surface by a vacuum formed between a suction pad 14 in the suction base unit 10 and the flat surface. The flat surface (not shown) will typically be a tabletop or a tray surface of a baby chair. The food bowl 12 has a base 16 with a rim 18 adapted to rest on the flat surface to support the bowl 12 on the surface. As can be seen most clearly in FIGS. 1 and 5, the base 16 has a recess 20 adapted to receive the suction base unit 10 therein. Because the suction base unit 10 is of low profile it can be wholly contained within the base 16 of the bowl, as shown most clearly in FIG. 4.

A securing mechanism 22 is provided for releasably securing the suction base unit 10 within the base 16 of the food receptacle 12. In use, when the suction base unit 10 is attached to a flat surface and the receptacle 12 is secured thereto the rim 18 of the receptacle base 16 presses against the flat surface and supports the receptacle thereon. In other words, although the suction base unit 10 secures the bowl 12 to the flat surface, the bowl itself rests on the flat surface in a conventional manner. One benefit of this arrangement is that the bowl or other kind of food receptacle 12 can be of any size and shape and is not limited to the size of the suction base unit 10. A further benefit is that the receptacle 12 itself sits on the surface on which it is being' used which not only means that it is firmly supported on that surface but it encompasses and encloses the suction base unit 10 thereby preventing access to the suction base unit. In the case of a baby bowl this is particularly useful to stop the child trying to pull the suction base unit 10 off the surface.

The securing mechanism 22 of the illustrated embodiment comprises a plurality of interlocking surfaces provided on the suction base unit 10 and within the recess 20 of the base 16 of the bowl 12 respectively. The suction base unit 10 preferably comprises a base plate 24 which has a first set of interlocking surfaces 26 provided thereon. The first set of interlocking surfaces 26 are in the form of a plurality of tabs 26*a* and 26*b* which extend laterally from the base plate 24, as can be seen most clearly in FIGS. 1 and 2. A second set of interlocking surfaces 28 is provided on undercuts within the base 16 of the bowl. In this embodiment the undercuts are formed by welding a C-shaped plate 30 into recess 20 of the base 16 of the bowl. However it will be understood that a similar effect could be achieved by moulding suitable undercuts into the recess 20 of the bowl, or by attaching a separate C shaped plate by overmoulding or by screws.

Figures 3A, 3B:
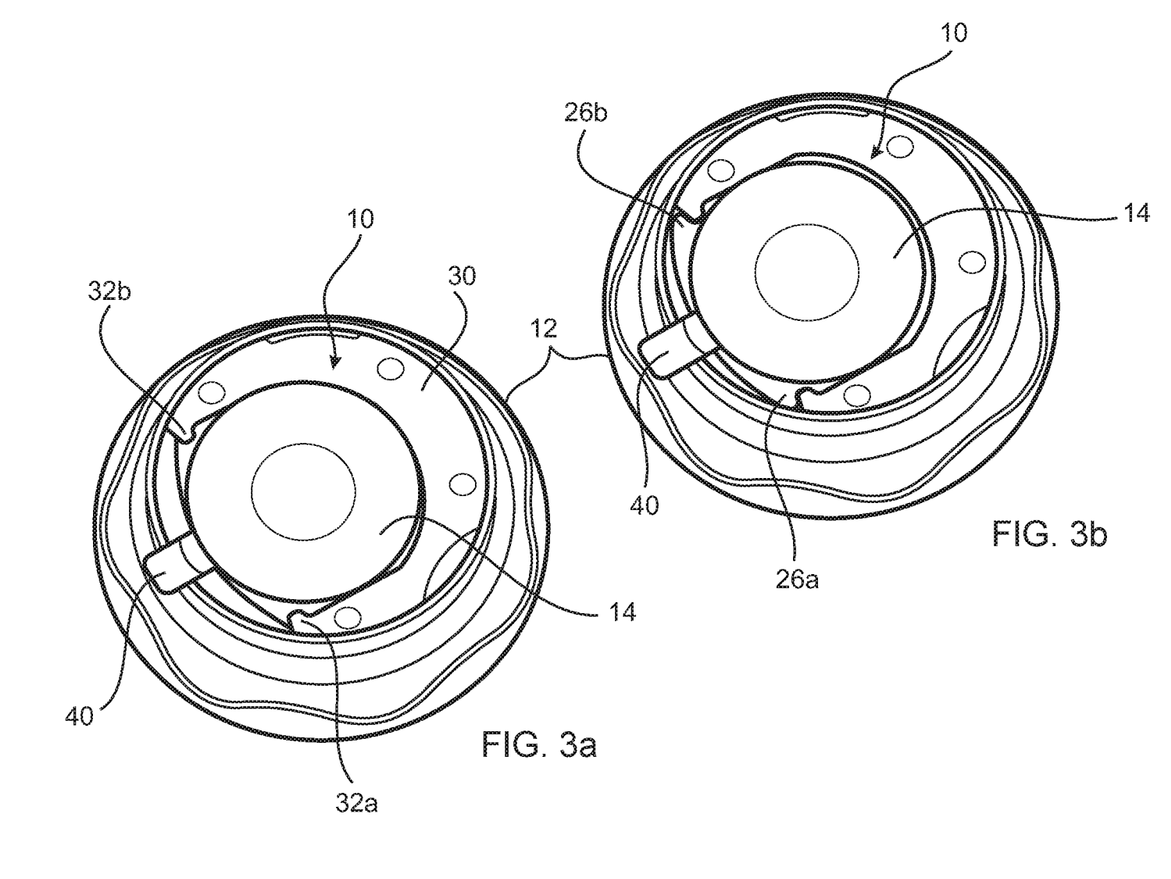
Figure 4A:
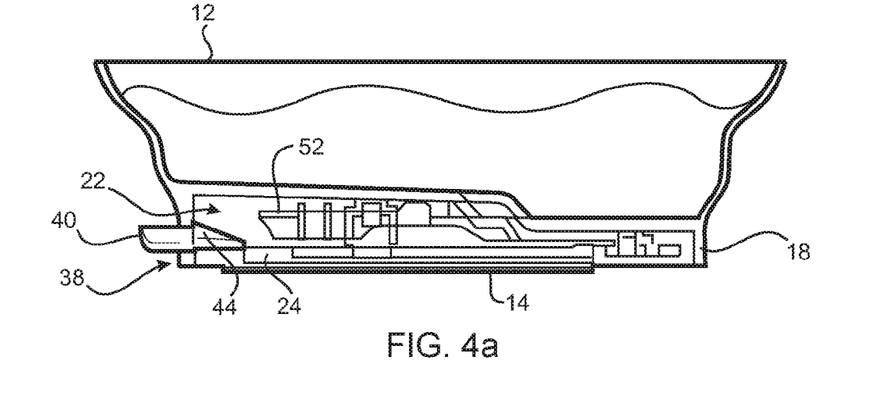
Figure 4B:
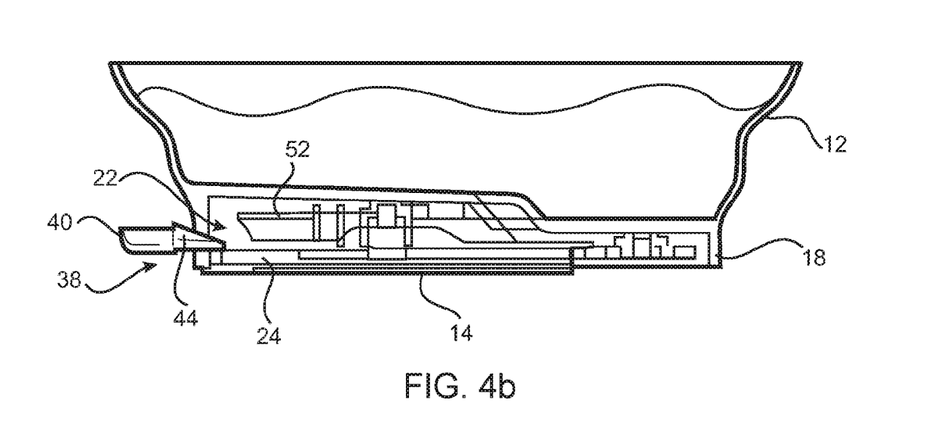
Figure 5:
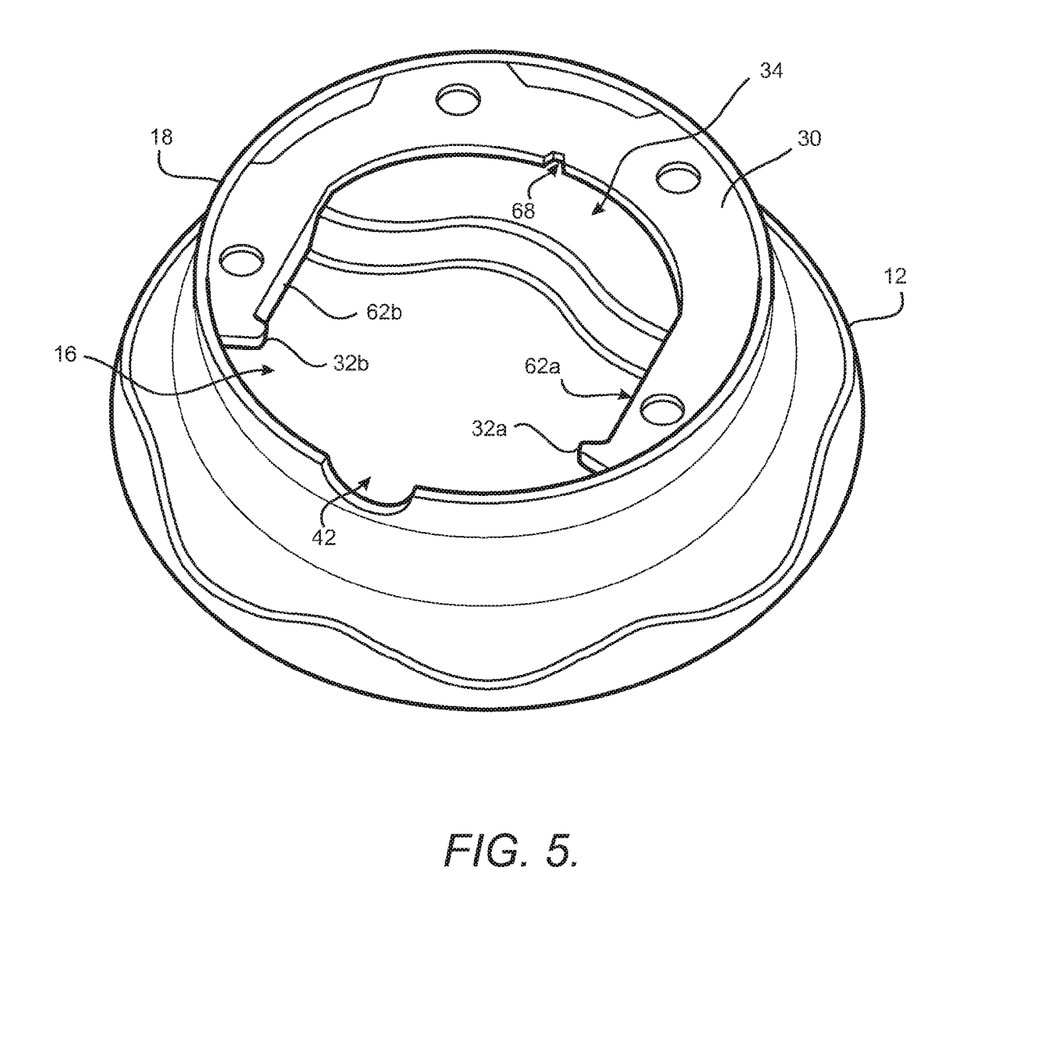
FIG. 5 is a bottom perspective view of the food receptacle of FIG. 1.

The C-shaped plate 30 also includes first and second tabs 32*a* and 32*b* which are adapted to engage with first and second tabs 26*a* and 26*b* on the base plate 24, when the suction base unit 10 is in the secured position within the base 16 of the receptacle 12. The C-shaped plate 30 has an aperture 34 (see FIG. 5) which is large enough to receive the suction base unit 10 there through in a released position, as shown in FIGS. 3 (*b*) and 4 (*b*). Once the suction base unit 10 is received in the base of the bowl, it can be moved to a secured position by sliding the unit parallel to the C-shaped plate 30 so that the first and second interlocking surfaces interlock to secure the suction base unit 10 within the base 16.

In order to move the suction base unit 10 to the secured position, as shown in FIGS. 3 (*a*) and 4 (*a*), the first and second tabs 26*a* and 26*b* on the base plate 24 and the first and second tabs 32*a* and 32*b* on the C-plate 30 have to flex when they engage with each other respectively, as they are deliberately designed to interfere with each other. The result is that when the suction base unit 10 is attached to a flat surface, and the bowl is moved relative to the base unit 10 to bring the base unit to the secured position, it effectively pulls the rim 18 of the base 16 of the bowl downwards so that it presses against the surface and is firmly supported thereon.

Preferably a locking mechanism 38 is provided in connection with the suction base unit 10 for locking the base unit 10 in the secured position. The locking mechanism 38 is adapted to releasably lock the suction base unit 10 within the base 16 of the receptacle 12 when it is in the secured position. This means that, in use, in order to separate the bowl 12 from the suction base unit 10 the locking mechanism 38 must first be released and only then can the suction base unit be moved from the secured to the released position.

The locking mechanism 38 is designed to prevent horizontal sliding movement of the bowl (when the suction base unit 10 is attached to a horizontal surface). In the illustrated embodiment the locking mechanism 38 comprises a horizontally extending locking lever 40 which extends from the base plate 24 through an arch 42 in the rim of the base 16 of the bowl. The locking lever 40 is adapted to engage with a part of the base of the bowl 12 to releasably lock the suction base unit within the base of the bowl. As can be seen most dearly in FIGS. 3 and 4, the locking lever 40 extends radially outwards from the base plate 24 and is sufficiently resilient to be able to flex between a locked position and a released position.

The locking lever 40 has a vertical protrusion 44 extending upwards from the lever and adapted to engage with the inside edge of the arch 42 in a locked position. The lever 40 flexes downwards as the top of the arch 42 travels over the lever, until the vertical protrusion 44 has passed under the arch 42. At this point in its travel the lever 40 returns to its non-flexed position whereupon the vertical protrusion 44 locks onto the inside edge of the rim 18. An alternative locking mechanism may use other configurations of the locking lever. For example, a locking lever that travels through a hole or recess in the rim or the underside of the receptacle whereby, in use, the lever is compressed or flexed in a horizontal manner rather than in a vertical manner as in the illustrated embodiment.

Figure 6:
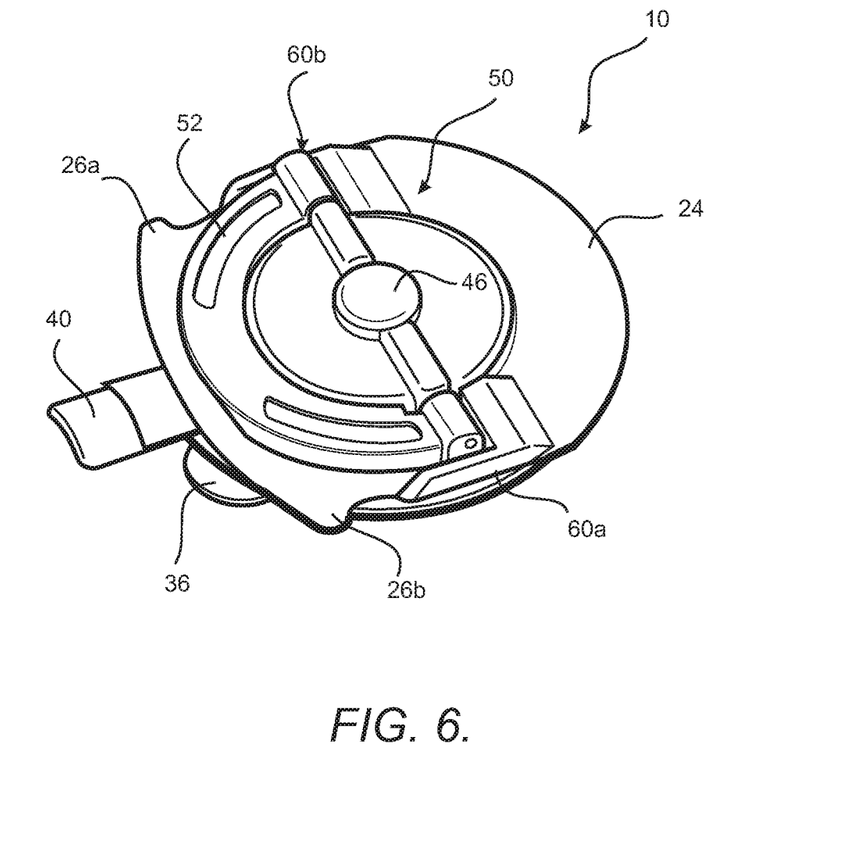
FIG. 6 is a top perspective view of the suction base unit of FIG. 1.
Figure 7:
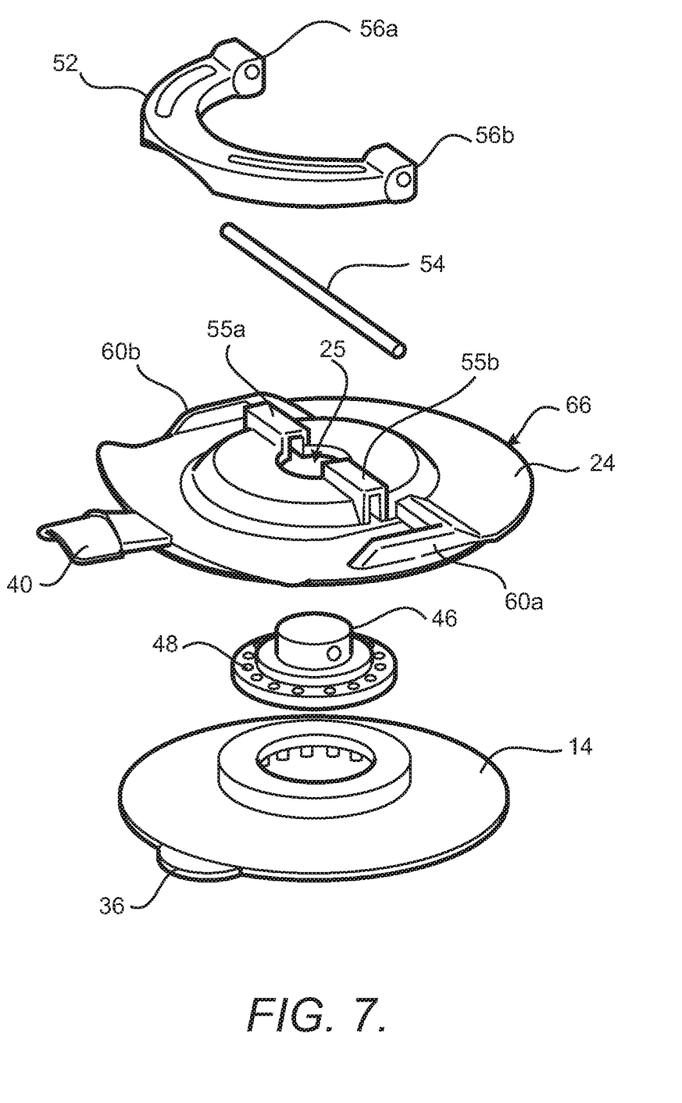
FIG. 7 is an exploded view of the suction base unit of FIG. 6.
Figure 8A:
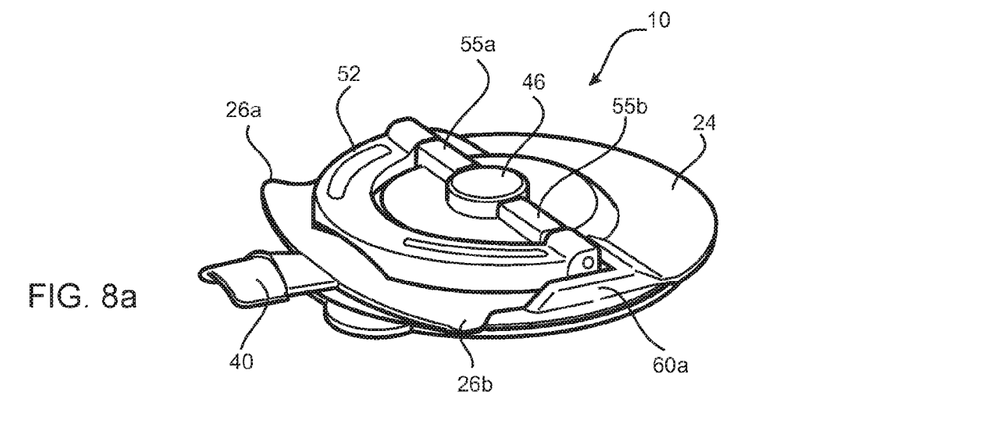
Figure 8B:
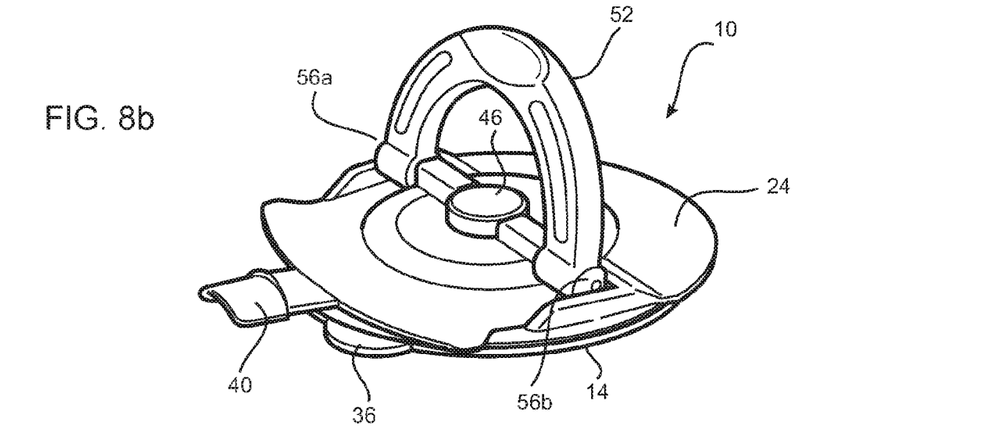
Figure 8C:
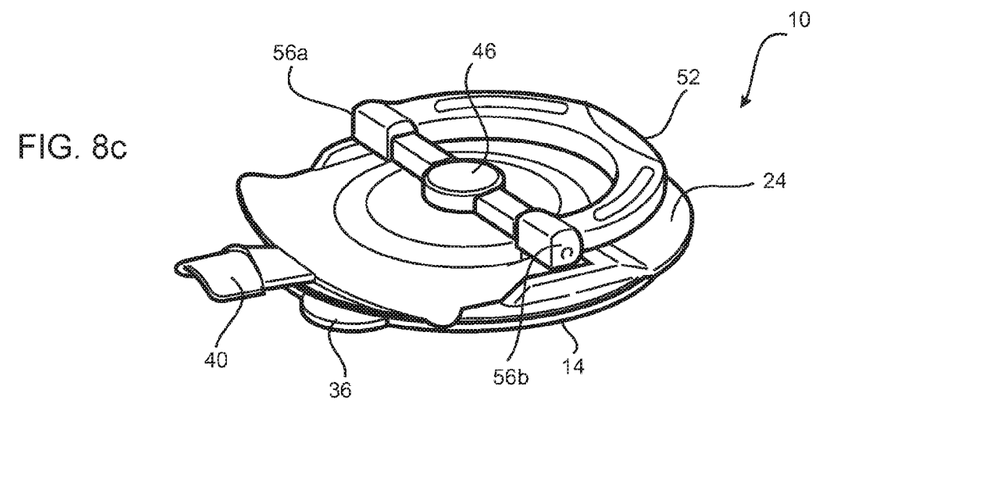

The structure and function of the suction base unit 10 will now be described in more detail with reference to FIGS. 6 to 8. It will be understood that the suction base unit may be used for securing other objects to a flat surface, for example, a laptop computer, a writing surface, etc. In addition to the suction pad 14 and base plate 24, the suction base unit 10 preferably further comprises a central core component 48 provided in connection with the suction pad 14 and adapted to form the vacuum between the suction pad and the flat surface when it is lifted from the surface. The base plate 24 has a central opening 25 through which a part 46 of the central core component 48 extends, as can be seen most clearly in FIGS. 6 and 8.

Preferably a lifting mechanism 50 is operatively connected to the central component 48 and is adapted to move the central core component 48 between a released position and a lifted position. In use, when the suction base unit 10 is pressed against a flat surface and the lifting mechanism 50 is operated to move the core component 48 from the released to the lifted position, the base unit 10 is securely attached to the flat surface by the vacuum formed between the suction pad 14 and the flat surface.

In the illustrated embodiment, the lifting mechanism 50 comprises a handle 52 which is pivotally connected to the central core component 48 by a pivot pin or rod 54. The pivot pin 54 is received in first and second channels 55*a* and 55*b* which are moulded into the upper surface of the base plate 24, on either side of the central opening 25. These channels enable the pivot pin 54 to engage with both the handle 52 and the core component 48 and prevent lateral movement of the base plate 24 (and hence the bowl). It is this fact which enables the suction base to have a low profile unlike other suction bases, which require some degree of height of the base plate to achieve the lifting motion to create suction. The size of these channels is what controls the degree of lateral movement—and as they have narrow internal spaces, the movement is minimised.

The handle 52 is movable between first, second and third positions corresponding to the released position, engaged position and the lifted position of the central core component 48 respectively. Preferably the handle 52 is generally planar and is movable through substantially 180° so that it lies substantially parallel to the base plate in both the first and third positions. The handle 52 is shown in the third position in FIGS. 6 and 8 (*a*), and in the second position in FIG. 8 (*b*).

Preferably the handle 52 is in the shape of a half-annulus, having first and second pivot portions 56*a* and 56*b* provided at each end respectively of the half-annulus. Preferably the pivot pin 54 is received in, and extends between, the first and second pivot portions 56*a* and 56*b*, and through the first and second channels 55, as can be seen most clearly in FIG. 7. The first and second pivot portions 56*a* and 56*b* engage with an upper surface of the base plate 24 when the handle 52 is moved between the first, second and third positions. Preferably a pivot axis of the pivot pin 54 which passes through the first and second pivot portions 56*a* and 56*b*, is offset from a central plane of the handle 52, so that when the handle is moved from the first through to the third position the pivot pin 54 is lifted from the upper surface of the base plate 24.

Preferably the pivot pin 54 also passes through the part 46 of the core component 48 which extends through the central opening 25 in the base plate 24. An aperture is provided in the part 46 of the central core component 48 for receiving the pivot pin 54, as can be seen most clearly in FIG. 7. Therefore when the handle 52 is moved from the second to the third position the part 46 is also lifted. It is this lifting action applied to the central core component 48 which lifts the centre of the suction pad 14 from the surface to form a vacuum between the suction pad and the surface. Typically the core component 48 only needs to be lifted 1 to 2 mm to form the vacuum.

Preferably the central core component 48 is integrated with the suction pad 14. Preferably the suction pad 14 is substantially circular in shape and the base plate 24 is also of generally circular shape, as in the illustrated embodiment. Preferably it is provided with a tab 36 on its periphery to aid in breaking the vacuum when releasing the suction base unit 10 from the flat surface.

Preferably the base plate 24 is formed with first and second substantially straight edge portions 60*a* and 60*b*. The first and second straight edge portions 60 are provided on opposite sides of the base plate 24 and are substantially parallel to each other, as shown in FIG. 6. Advantageously the first and second straight edge portions 60 are adapted to engage with corresponding first and second flat surfaces 62*a* and 62*b* provided in a base 16 of the food receptacle (see FIG. 5). In the illustrated embodiment, the first and second flat surfaces 62 are formed integral to the C-shaped plate 30. The first and second flat surfaces 62 are designed to prevent the suction base unit 10 from sideways or rotational movement once it is received in the base 16 of the food receptacle.

Preferably the base plate 24 is also formed with a protrusion 66 which is adapted to engage with a recess 68 formed in the C-shaped plate 30, (see FIG. 5) when the suction base unit 10 is moved to the secured position. This further assists in preventing rotational movement of the suction base unit 10 within the base 16 of the bowl, once it is in the secured position.

Operation of the suction base unit 10 in combination with the food receptacle 12 will now be described with reference to FIGS. 1 to 4. When it is desired to attach the food bowl 12 to a table top, the suction base unit 10 is first placed in the desired location of the bowl, with the handle 52, preferably in the first position. In this position the central core component 48 moves freely in the central opening 25. One means to secure the food bowl 12 to the table top is by pressing down on the core component 48, by moving the handle 52 toward the second position and applying a downwards pressure on the handle 52, any air between the suction pad 14 and the table top can be squeezed out. The handle 52 is then pivoted to the third position, while a downwards pressure continues to be applied to the central core component 48 via the handle 52. Movement of the handle 52 to the third position will cause the central core component 48 to lift producing a vacuum between the suction pad 14 and the table top.

A second means to secure the food bowl 12 to the table top is by moving the handle 52 toward the second position and applying a downwards pressure on the part 46 of the central core component 48, any air between the suction pad 14 and the table top can be squeezed out. The handle 52 is then pivoted to the third position, while continuing to exert a downwards pressure on the central core component 48 via pressure on part 46 of the central core component 48. Movement of the handle 52 to the third position from the second position will cause the central core component 48 to lift producing a vacuum between the suction pad 14 and the table top.

Figure 1:
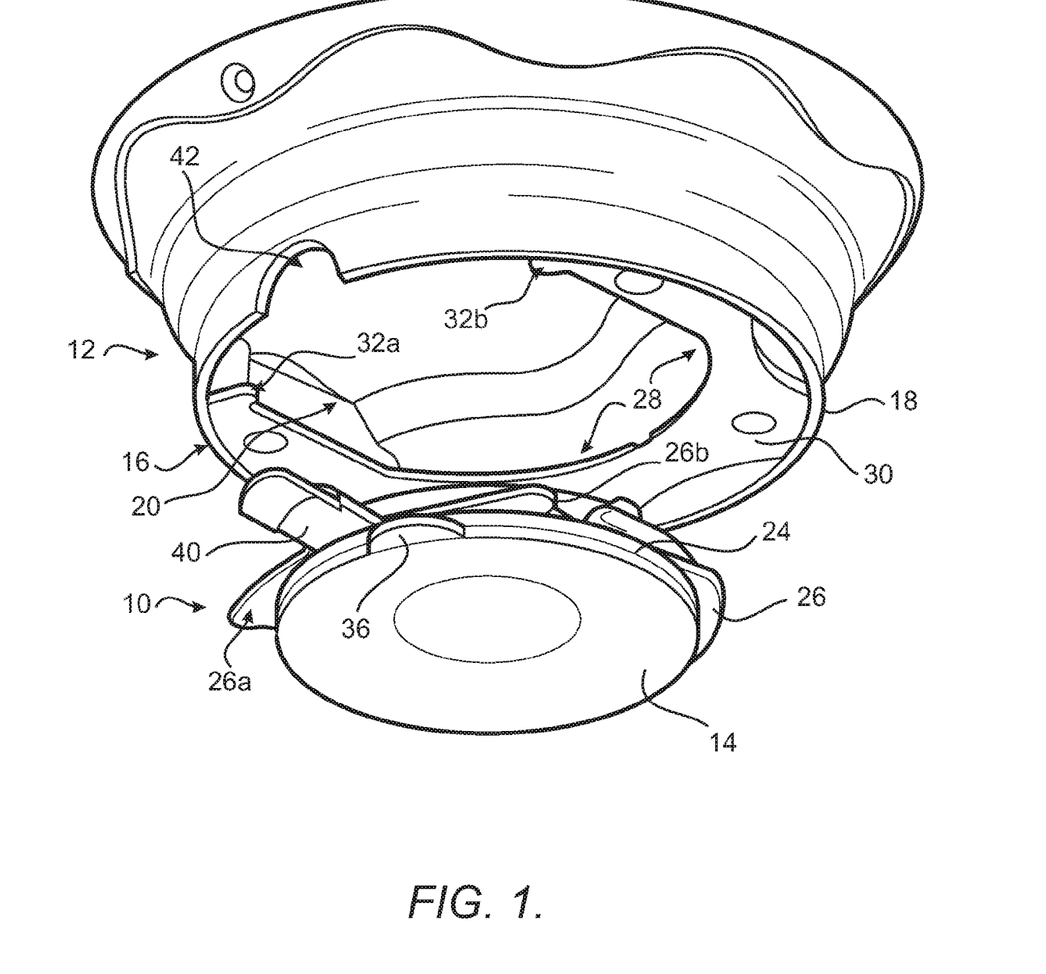
FIG. 1 is a bottom perspective view of a first embodiment of a suction base unit and a food receptacle according to the present invention, shown separated from each other.
Figure 2:
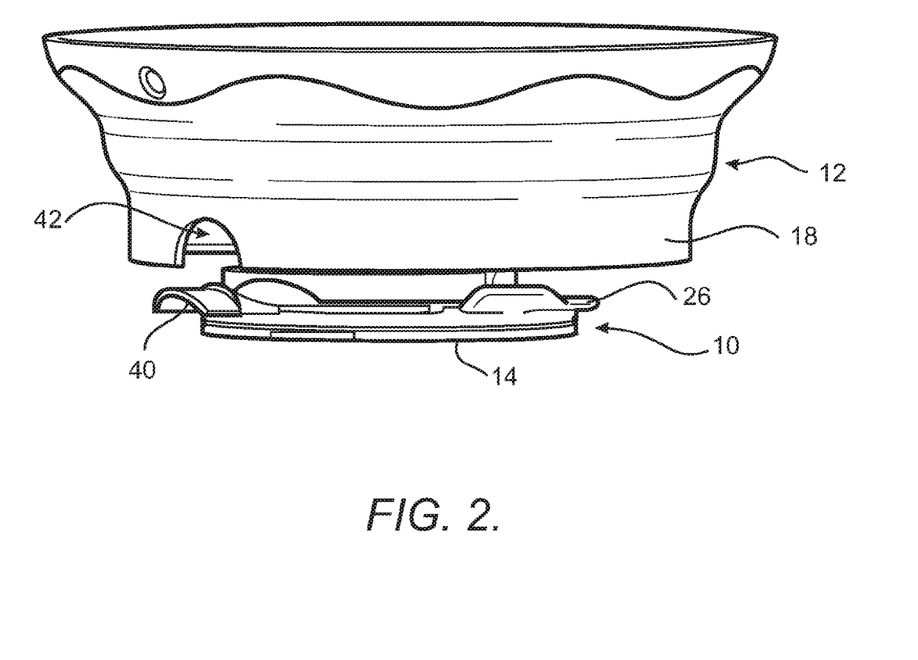
FIG. 2 is a side elevation of the suction base unit and food receptacle of FIG. 1.

The bowl 12 is then lowered onto the suction base unit 10 with the first and second flat surfaces 62 of the base 16 aligned with the first and second straight edge portions 60 of base plate 24, as shown in FIGS. 1, 2 and 3 (*b*). In this released position, the suction base unit 10 is wholly received within the aperture 34 of the C-shaped plate 30 in the base 16 of the bowl (see FIG. 5). With the bowl fully lowered onto the suction base unit 10, so that the rim 18 of the base 16 rests on the tabletop, the only part of the base unit 10 which remains visible is the free end of the locking lever 40. The bowl is then slid horizontally in the direction of the locking lever so that the first and second interlocking surfaces interlock to secure the suction base unit 10 within the base 16. As the position of the suction base unit 10 relative to the bowl 12 moves to the secured position, as shown in FIGS. 3 (*a*) and 4 (*a*), the first and second tabs 26*a* and 26*b* on the base plate 24 and the first and second tabs 32*a* and 32*b* on the C-plate 30 flex as they engage with each other respectively. With the result that in the secured position, the first and second tabs 32*a* and 32*b* on the C-shaped plate 30 are pushed downwards so as to exert a downwards pressure on the bowl against the tabletop surface.

Throughout the relative movement of the bowl 12 and the suction base unit 10, locking lever 40 of the locking mechanism 38 flexes downwards as the top of the arch 42 travels over the lever, until the vertical protrusion 44 has passed under the arch. When the suction base unit 10 reaches the secured position, the locking lever 40 returns to its non-flexed position and the vertical protrusion 44 locks onto the inside edge of the rim 18. It is now substantially impossible to move the bowl 12 relative to the suction base unit 10, without exerting inordinate force. The only way the bowl can be moved is by pressing down on the free end of the locking lever 40 until the vertical protrusion 44 disengages from the edge of the rim 18. The bowl can then be moved from the secured position to the released position and lifted off the suction base unit 10. Because of this two-step process it is highly unlikely that a small child will be able to figure out how to remove the bowl from the suction base unit 10.

All the components of the suction base unit 10 and food receptacle 12 are preferably made from injection moulded plastics material. Preferably the suction base unit 10 and food receptacle 12 are made from polypropylene. However it will be understood that any suitable material may be used.

Now that preferred embodiments of the suction base unit and food receptacle have been described in detail, it will be apparent that the described embodiments provide a number of advantages over the prior art, including the following:

(i) The suction base unit virtually becomes integrated into the underside of the receptacle which substantially prevents the receptacle from moving in a horizontal, vertical or rotational manner.

(ii) The low profile design of the suction base unit means that it can be substantially contained within the base of the receptacle, which is not only aesthetically attractive but also enables the receptacle to be supported on the tabletop surface in a conventional manner.

(iii) The combination of the securing mechanism and the locking mechanism means that the receptacle can only be removed from the suction base unit by a two-step process, which is too complex for a small child to figure out (iv) The suction base unit does not employ a spring, as in prior art units, and therefore avoids the attendant problems associated with the increased height of these prior art suction base units, including the substantial degree of leverage this affords to a child.

It will be readily apparent to persons skilled in the relevant arts that various modifications and improvements may be made to the foregoing embodiments, in addition to those already described, without departing from the basic inventive concepts of the present invention. For example, the lifting mechanism for lifting the centre of the suction pad could be quite different from that described. A screw-thread lifting mechanism could also perform a similar function. Therefore, it will be appreciated that the scope of the invention is not limited to the specific embodiments described.

The invention claimed is:

1. A low-profile suction base unit for securing an object to a flat surface, the suction base unit comprising:
   a suction pad adapted to attach the suction base unit to a flat surface by a vacuum formed between the suction pad and the flat surface;
   a central core component provided in connection with the suction pad and adapted to form the vacuum between the suction pad and the flat surface when it is lifted from the surface;
   a base plate having a central opening through which part of the central core component extends; and,
   a lifting mechanism operatively connected to the central core component and adapted to move the central core component between a released position and a lifted position, the lifting mechanism comprising a handle which is pivotally connected to the central core component by a pivot pin, the handle being movable between first and third positions corresponding to the released position and the lifted position of the central core component respectively, and wherein the handle is generally planar and is in the shape of a half-annulus, having first and second pivot portions provided at each end of the half-annulus, and wherein the pivot pin is received in and extends between the first and second pivot portions, the first and second pivot portions engaging with an upper surface of the base plate when the handle is moved between the first and third positions, wherein, in use, when the suction base unit is pressed against a flat surface and the lifting mechanism is operated to move the core component from the released to the lifted position the base unit is securely attached to the flat surface by the vacuum formed between the suction pad and the flat surface;

the pivot pin is received in first and second channels which are provided on an upper surface of the base plate on either side of the central opening wherein, in use, the channels enable the pivot pin to engage with both the handle and the core component and prevent lateral movement of the base plate (and hence the object);

the handle is movable through substantially 180°, so that it lies substantially parallel to the base plate in both the first and third positions;

the handle lies substantially at 90° to the base plate when it is in a second position;

a pivot axis of the pivot pin which passes through the first and second pivot portions, is offset from a central plane of the handle, so that when the handle is moved from the first through to the third position the pivot pin is lifted away from the upper surface of the base plate;

the base plate further comprises a locking lever which is adapted to engage with a part of a base of the object, such as a food receptacle, to releasably lock the suction base unit within the base of the object; and the locking lever extends radially outwards from the base plate and is sufficiently resilient to be able to flex between a locked position and a released position.

2. A suction base unit as defined in claim 1, wherein the suction pad is substantially circular in shape and the base plate is also of generally circular shape.

3. A suction base unit as defined in claim 2, wherein the base plate is formed with first and second substantially straight edge portions, the first and second straight edge portions being provided on opposite sides of the base plate and being substantially parallel to each other.

4. A suction base unit as defined in claim 3, wherein the first and second straight edge portions are adapted to engage with corresponding first and second flat surfaces provided in a base of the food receptacle.

5. A suction base unit as defined in claim 1, wherein the object is a food receptacle for children.

\* \* \* \* \*